United States Patent
Vilar et al.

(10) Patent No.: US 11,891,777 B2
(45) Date of Patent: Feb. 6, 2024

(54) ELECTRIC BRAKING POWER USED FOR BATTERY REGENERATION IN A MOBILE WORK MACHINE

(71) Applicant: Deere & Company, Moline, IL (US)

(72) Inventors: Eric Vilar, Asbury, IA (US); Joseph E. Lukaszewski, Benton, WA (US)

(73) Assignee: Deere & Company, Moline, IL (US)

( * ) Notice: Subject to any disclaimer, the term of this patent is extended or adjusted under 35 U.S.C. 154(b) by 433 days.

(21) Appl. No.: 17/153,250

(22) Filed: Jan. 20, 2021

(65) Prior Publication Data

US 2022/0228348 A1 Jul. 21, 2022

(51) Int. Cl.
*E02F 9/20* (2006.01)
*E02F 9/22* (2006.01)
*B60L 1/00* (2006.01)
*H02P 3/12* (2006.01)

(52) U.S. Cl.
CPC .......... *E02F 9/207* (2013.01); *E02F 9/2075* (2013.01); *E02F 9/2217* (2013.01); *H02P 3/12* (2013.01); *B60L 1/003* (2013.01)

(58) Field of Classification Search
CPC ....... E02F 9/207; E02F 9/2075; E02F 9/2217; E02F 9/2091; B60L 2200/40; B60L 2240/545; B60L 2260/162; B60L 58/15; B60L 1/00; B60L 7/10; B60L 7/24; B60L 58/10; B60L 2240/54; H02P 3/12; H02P 3/14; H02P 3/22
See application file for complete search history.

(56) References Cited

U.S. PATENT DOCUMENTS

| | | | |
|---|---|---|---|
| 9,720,047 B2 | 8/2017 | Joe | |
| 10,112,491 B2 | 10/2018 | Lieu et al. | |
| 10,186,887 B2 | 1/2019 | Wang et al. | |
| 10,933,874 B2 | 3/2021 | Cho | |
| 2008/0288192 A1* | 11/2008 | Kumar | B60T 17/221 702/60 |
| 2013/0099561 A1* | 4/2013 | Raman | B60L 1/10 307/9.1 |
| 2014/0200756 A1* | 7/2014 | Sisk | B60L 1/08 903/903 |
| 2020/0156500 A1 | 5/2020 | Huff et al. | |
| 2020/0317065 A1 | 10/2020 | Lambardo | |

FOREIGN PATENT DOCUMENTS

| | | | |
|---|---|---|---|
| CN | 104065122 A * | 9/2014 | |
| DE | 102019208422 A1 | 12/2019 | |
| DE | 102020210997 A1 | 3/2020 | |
| DE | 102019203592 A1 | 9/2020 | |
| WO | WO-2021071655 A1 * | 4/2021 | ........... A01D 34/006 |

OTHER PUBLICATIONS

German Search Report issued in application No. DE102021213343.6 dated Aug. 18, 2022 (10 pages).

* cited by examiner

*Primary Examiner* — Bickey Dhakal
(74) *Attorney, Agent, or Firm* — Joseph R. Kelly; Kelly, Holt & Christenson PLLC

(57) ABSTRACT

The available power surge capacity of a battery is detected. The available steady state regeneration energy capacity of the battery is also detected. The available battery generation power, available from an electric motor, is detected as well. The generation power available from the electric motor is applied to regenerate (or recharge) the battery based upon the available power surge capacity, and the available steady state capacity of the battery.

20 Claims, 5 Drawing Sheets

ELECTRIC BRAKING POWER USED FOR BATTERY REGENERATION IN A MOBILE WORK MACHINE

FIELD OF THE DESCRIPTION

The present description relates to electrically powered work machines. More specifically, the present description relates to applying braking energy for battery regeneration in a battery powered work machine.

BACKGROUND

There are many different types of mobile work machines. Such work machines can include loaders, backhoes, excavators, graders, tracked crawlers, tractors, among others. Such mobile machines include a power supply that drives ground engaging elements, such as wheels or tracks.

In some mobile work machines, the power source is an electric power source (such as a battery) that is used to power one or more electric motors. The electric motors, in turn, drive the ground engaging elements through a transmission, which may be a direct connection transmission, or a geared and clutched transmission, or another type of transmission. Other mobile work machines are powered by hybrid systems which can use power from both an electric power source (such as a battery) and an engine, such as a gasoline or diesel fuel powered engine.

The discussion above is merely provided for general background information and is not intended to be used as an aid in determining the scope of the claimed subject matter.

SUMMARY

The available surge capacity of a battery is detected. The available steady state regeneration energy capacity of the battery is also detected. The available battery generation power, available from an electric motor, is detected as well. The generation power available from the electric motor is applied to regenerate (or recharge) the battery based upon the available surge energy capacity, and the available steady state capacity of the battery.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
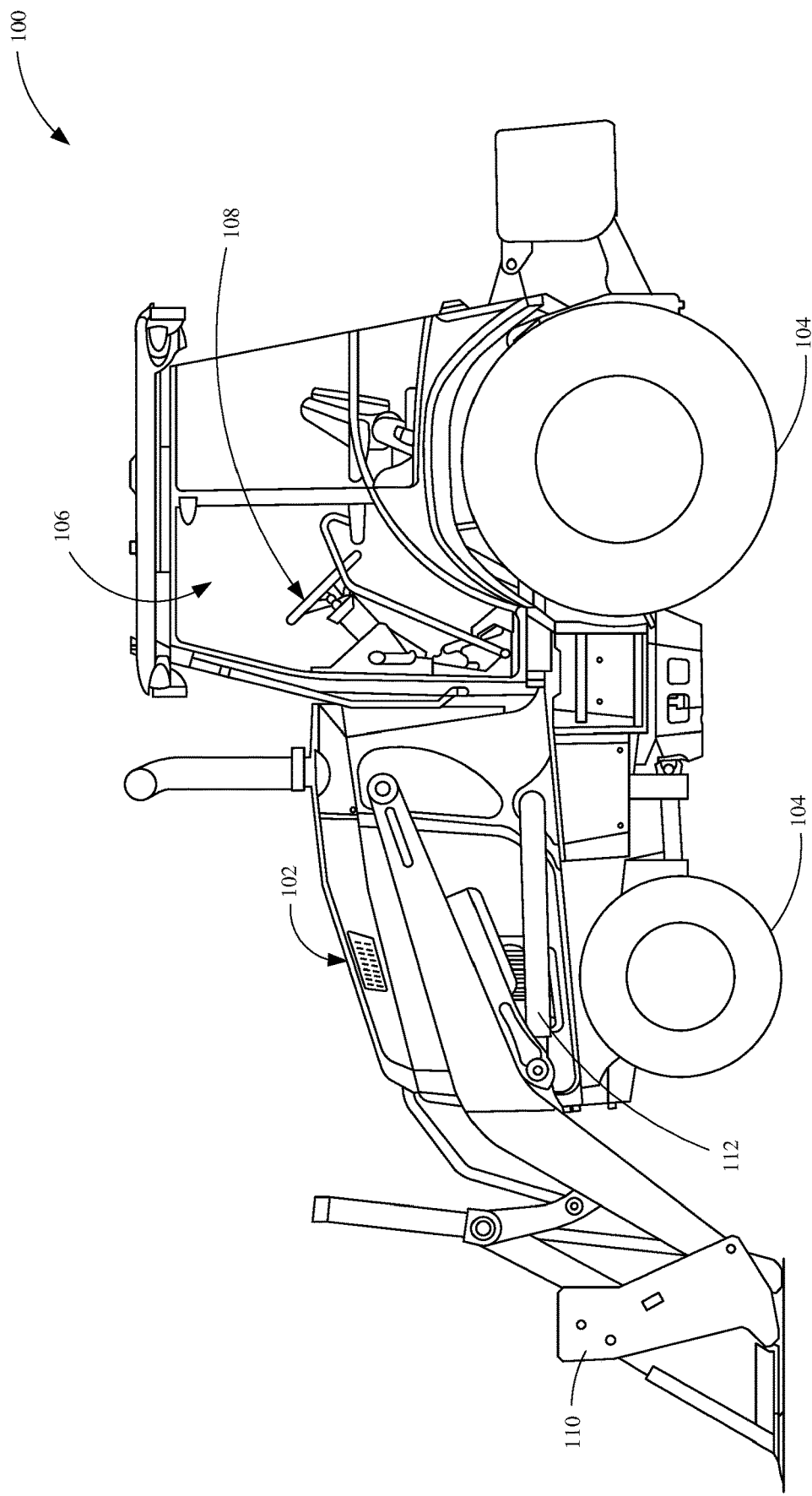
FIG. 1 is a pictorial illustration of one example of a mobile work machine.

As discussed above, many mobile work machines are powered fully or partially using an electrical power source, such as a battery. The battery is used to power one or more electric motors. Battery life thus affects the timing and efficiency with which such work machines are able to perform operations.

In order to increase the operational life of the battery, such work machines can be configured so that, when the electric motor is braking, the braking energy generated by the electric motor is applied to the battery to regenerate or recharge the battery. However, this can present a number of different problems. The ability of a battery to accept recharging energy (also referred to as regeneration energy), such as that applied by a motor during electric braking, varies with the temperature of the battery. For example, a battery at 0° C. may only accept regeneration energy at 50% of the rate with which the battery can accept the regeneration energy when at 25° C. At −10° C., the same battery may only be able to accept regeneration energy at 15% of the rate with which the warmer battery can accept regeneration energy.

The same issues are present with a torque converter transmission driven by an electric motor, which needs a braking load for the motor to facilitate downshifting while at speed. Similar issues arise with electrically propelled direct drive transmissions, when they are performing reversals. These transmissions typically do not have a reversing clutch and instead depend on the electric motor to slow the machine down to a stop and then accelerating the motor in the opposite. During slowing of the machine, the electric motor can act as a generator as well.

Applying the regeneration energy to the battery may be desirable, as it increases the time that the mobile work machine can operate under battery power. However, if the battery is unable to accept the regeneration power, then if the regeneration power is applied to the battery, it can damage the battery. Therefore, when the rate of braking energy (regeneration energy) available from the electric motor (such as during down shifts) is too high, then alternative actions need to be taken, instead of downshifting the motor and applying the braking energy to the battery. For instance, in some systems, the operator uses service brakes to slow the machine down, in which case the regeneration energy is burned off as heat rather than being applied to the battery and stored for extending runtime. This can lead to operator confusion or frustration, because the mobile work machine must be operated differently when the battery is cold (the manual brakes must be applied more often) than when the battery is warm.

Another way to handle the problem is to oversize the battery so that, even in cold conditions, the battery can accept the maximum braking energy that will be generated by the motor during electric braking. However, oversizing the battery in this way may be extremely costly. Yet another way to address the problem may be to permanently divert the braking energy available from the motor, into another device, such as a brake resistor. However, this means that the braking energy will not be used to regenerate the battery, thus penalizing the operational battery life.

It is also known that batteries can accept regeneration energy at two different rates. Batteries are able to accept regeneration at one rate during steady state operation of the battery. However, batteries are also able to accept surges of regeneration energy for short periods of time. The power surge capacity may be significantly higher than the steady state energy capacity. The present description thus proceeds with respect to a system that receives an input from the battery, indicating how much power surge capacity is available, as well as the battery's current steady state energy capacity. A charging control system applies regeneration energy to the battery based upon the available power surge capacity and steady state energy capacity of the battery. The battery can thus be sized appropriately because the present system takes advantage of the power surge capacity of the battery as well as its stead state capacity. This increases the runtime of the battery, and makes the operation of the machine more consistent over a wider temperature range.

FIG. 1 is a pictorial illustration of one example of a mobile work machine 100. In the example illustrated in FIG. 1, mobile work machine 100 is a loader that is powered (either in a hybrid system or a completely electrical system) by a power source located in power source compartment 102. The power source illustratively includes a battery that can be used to drive an electric motor. The electric motor can be used to drive ground engaging elements (e.g., wheels) 104 through a transmission. The transmission may be a direct drive transmission, a geared transmission, a clutched transmission, or another type of transmission. It will also be noted that, while FIG. 1 shows ground engaging elements 104 as wheels, they can be tracks or other ground engaging elements as well.

FIG. 1 also shows that mobile work machine 100 includes an operator compartment 106 that may have one or more operator interface mechanisms 108 that can be used for operator interaction. Machine 100 is also shown with an implement (such as a bucket 110) that may be actuated using one or more actuators 112.

Figure 2:
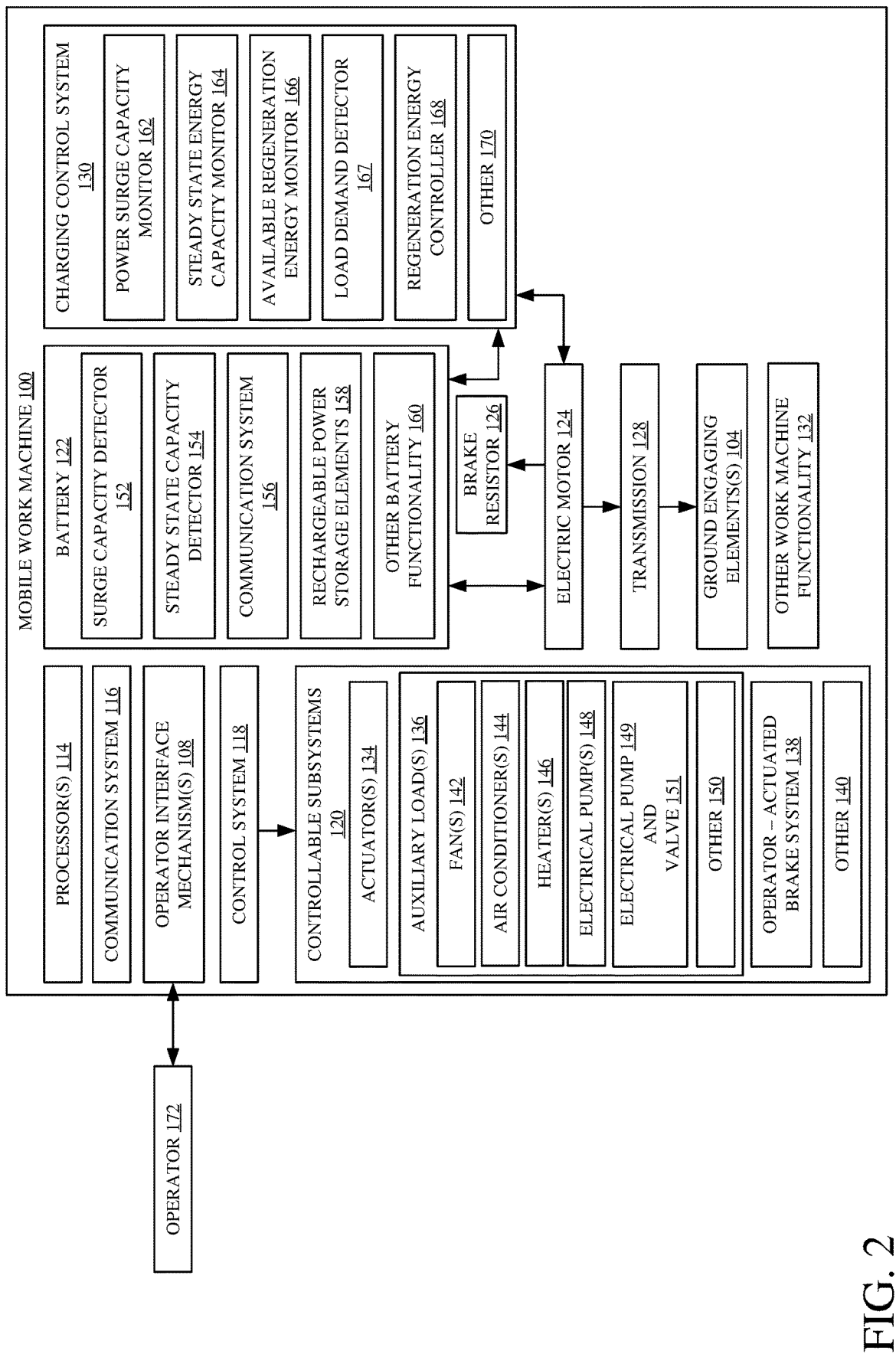
FIG. 2 is a block diagram of one example of the mobile work machine illustrated in FIG. 1.

FIG. 2 is a block diagram showing portions of mobile work machine 100 in more detail. Some items shown in FIG. 2 are similar to those shown in FIG. 1, and they are similarly numbered. FIG. 2 shows that work machine 100 can include operator interface mechanism(s) 108, one or more processors 114, communication system 116, control system 118, controllable subsystems 120, battery 122, electric motor 124, brake resistor 126, transmission 128, charging control system 130, and it can include a wide variety of other work machine functionality 132. In the example shown in FIG. 2, controllable subsystems 120 can include actuators 134 (which may include the actuators 112 illustrated in FIG. 1 and other actuators), auxiliary loads 136, an operator-actuated brake system 138, and other controllable subsystems 140. Auxiliary loads 136 can include fans 142, air conditioners 144, heaters 146, electrical pumps 148, an electrical pump 149 coupled to drive hydraulic fluid through a valve 151, and a wide variety of other auxiliary loads 150. Battery 122 can include surge capacity detector 152, steady state capacity detector 154, communication system 156, rechargeable power storage 158, and any of a wide variety of other battery functionality 160. Charging control system 130 may include power surge capacity monitor 162, steady state energy capacity monitor 164, available regeneration energy monitor 166, load demand detector 167, regeneration energy controller 168, and it can include other items 170. Before describing the overall operation of mobile work machine 100 in applying regeneration energy to battery 122, a brief description of some of the items in machine 100, and their operation, will first be provided.

Communication system 116 can be any of a wide variety of different types of communication systems that facilitate communication among the items on mobile work machine 100. For instance, it can be a controller area network (CAN) communication system that controls a CAN bus so that items in machine 100 can communicate with one another. Communication system 116 can also include a communication system that facilitates communication with remote systems, that are remote from machine 100, such as a cellular communication system, a near field communication system, a local area network communication system, a wide area network communication system, or any of a wide variety of other communication systems or combinations of systems.

Operator interface mechanisms 108 can include mechanisms that are provided for interaction by an operator 172. The operator interface mechanisms 108 can include a steering wheel, joysticks, levers, linkages, buttons, pedals, display screens, touch sensitive display screens, a microphone and speaker (such as a where speech recognition and/or speech synthesis functionality is provided), icons or links or other items that can be actuated using a touch gesture or a point and click device or in other ways, and/or any other audio, visual, or haptic device.

Actuators 134 can include any of a wide variety of different types of actuators on machine 100. Actuators 134 can include electrical actuators, electro-hydraulic actuators, or other actuators that may be powered by battery 122. There may be, of course, a wide variety of other actuators on machine 100 as well.

Auxiliary loads 136 are items that are powered by battery 122, and that can be controllably activated, deactivated, or adjusted. Loads 136 can thus include electrically powered fans 142, an air conditioner 144 that is used to air condition operator compartment 106, one or more heaters 146, and/or electrical pumps 148 that can be used to pump hydraulic fluid, water, coolant, or other fluids. The auxiliary load 136 can also include an electric pump (or electric motor) 149 that is configured to pump hydraulic fluid through a valve 151. Valve 151 may have a hydraulic orifice so that motor 149 and valve 151 can be used to create a load similar to, or as an alternative to, break resistor 126 (described below). The auxiliary load 136 can be a wide variety of other electrical elements 150 that can be used to load battery 122.

Operator actuated brake system 138 can be a system that receives an input from an operator interface mechanism 108 (such as a brake pedal or other operator input mechanism) and that, in response, actuates a braking system, such as a caliper, or another braking system that can be actuated to reduce the travel speed of mobile work machine 100. Brake system 138 can be an electrically, pneumatically, or hydraulically assisted device as well.

Battery 122 may be used to power electric motor 124 and the electrically powered controllable subsystems 120. Battery 122 may also be used to power electrically operated operator interface mechanisms 108 and communication system 116 and any other items that may be battery powered, on machine 100. Battery 122 illustratively includes surge capacity detector 152 that detects the power surge capacity of battery 122. The surge capacity detector 152 provides a power surge capacity indicator that indicates the capacity of power or regeneration energy that battery 122 can receive. Surge capacity detector 152 can provide the power surge capacity indicator in a variety of different ways, some of which are described in greater detail below with respect to FIG. 3.

Similarly, steady state capacity detector 154 generates an output indicative of the steady state capacity of battery 122. The steady state capacity indicator indicates the amount of steady state regeneration energy that can be received by battery 122.

Communication system 156 illustratively allows surge capacity detector 152 and steady state capacity detector 154 to output their respective indicators to charging control system 130. Thus, communication system 156 may facilitate communication so detectors 152 and 154 output their respective indicators on a CAN bus that is arbitrated and controlled by a bus controller in communication system 116 or otherwise. Communication system 156 can facilitate the output of the power surge capacity indicator and the steady state capacity indicator in other ways as well.

Battery 122 also includes rechargeable power storage elements 158 that store the battery power that can be used to power the electrical elements of machine 100. The power storage elements 158 are rechargeable so that when regeneration energy is applied to rechargeable power storage elements 158, it regenerates those storage elements thus increasing the operational life of the battery 122.

Electric motor 124 is powered by battery 122 and is used to drive transmission 128 which, in turn, drives the ground engaging elements 104. As mentioned above, transmission 128 can be a direct drive transmission, a transmission that uses gears, a clutched transmission, or other transmissions. Electric motor 124 uses energy from battery 122 to drive transmission 128. However, electric motor 124 can also be used to brake transmission 128 (such as during a downshift, or other electric braking operation), in which case electric motor 124 becomes a generator. The energy generated by motor 124 (such as during an electric braking operation) can be applied back to battery 122 to recharge the rechargeable power storage elements 158.

However, the ability of battery 122 to receive the regeneration energy from electric motor 124 varies based on a number of different criteria. One of those criteria is battery temperature. When battery 122 is cold, its capacity to receive recharge energy may be diminished over that when it is warm. Also, the steady state capacity (the capacity of battery 122 to receive recharge energy in steady state operation) differs from, and is lower than, the power surge capacity of battery 122 (the rate at which battery 122 can receive regeneration energy momentarily, during surges). Power surge energy capacity monitor 162 monitors the power surge capacity indicator output by detector 152. Steady state energy capacity monitor 164 monitors the steady state capacity indicator output by detector 154. Available regeneration energy monitor 166 monitors the regeneration energy available from electric motor 124, such as during electric braking operations.

Regeneration energy controller 168 then controls where the regeneration energy provided by electric motor 124 is applied. It will be noted that, in one example, charging control system 130 may be part of electric motor 124 or separate from electric motor 124. In the example illustrated in FIG. 2, charging control system 130 is shown as being separate from electric motor 124, but this is done by way of example only. To the extent that battery 122 can receive the regeneration energy without being damaged, either as a short surge, or steady state operation, then regeneration energy controller 168 controls the electric motor 124 to apply the regeneration energy to rechargeable power storage elements 158. Where battery 122 cannot receive the regeneration energy (or all of the regeneration energy) without being damaged, then regeneration energy controller 168 diverts some or all of the regeneration energy away from battery 122. For instance, regeneration energy controller 168 can provide signals to control system 118 to increase the auxiliary loads 136 (e.g., by turning on fans 142 or increasing fan speed, by turning on air conditioners 144 and/or heaters 146, by increasing the output of electrical pumps 148 or 149, by controlling the orifice on valve 151, or other actuators 150). Increasing auxiliary loads 136 may consume enough of the regeneration energy that the remainder can be applied to the rechargeable power storage elements 158 in battery 122.

In addition, regeneration energy controller 168 can control electric motor 124 to apply some or all of the recharge energy to brake resistor 126 where that energy can be dissipated as heat. It is first assumed that mobile work machine 100 has an electric motor 124, and is operating. This is indicated by block 180 in the flow diagram of FIG. 3. At some point, electric motor 124 will become a generator so that regeneration power, such as during an electric braking operation, down shifting, etc. Therefore, there will be regeneration energy available from electric motor 124. Available regeneration energy monitor 166 detects the amount of regeneration energy available from motor 124. This is indicated by block 182. For instance, it may be that the rate of electrical braking is indicative of the available regeneration energy. Thus, the rate of braking can be provided to available regeneration energy monitor 166 to indicate the amount of regeneration energy available. Electric motor 124 may output any of a wide variety of metrics that are indicative of the regeneration energy that is currently available at the output of the motor.

Steady state capacity monitor 164 also detects the steady state capacity indicator output by detector 154, which is indicative of the steady state energy capacity of battery 122. Detecting the battery steady state regeneration energy capacity is indicated by block 184 in the flow diagram of FIG. 3. In one example, the steady state regeneration energy capacity of battery 122 may be based upon the temperature of battery 122. Thus, the indicator output by detector 154 may be a temperature output which is correlated, by steady state capacity monitor 164, to a steady state regeneration energy capacity of battery 122. The correlation can be done by accessing a lookup table, an energy/temperature curve, or a model, based upon the steady state capacity indicator output by detector 154, which outputs an indicator of a steady state regeneration energy capacity.

Load demand detector 167 then detects the combined load demand of the various auxiliary loads 136 in controllable subsystems 120. Detecting the combined load demand can be done by detecting the state of actuation, of the auxiliary loads 136, the drain on battery 122 by the various auxiliary loads 136, or in other ways. Detecting the auxiliary load demand is indicated by block 186 in the flow diagram of FIG. 3.

Regeneration energy controller 168 then determines whether the amount of regeneration energy available from motor 124 exceeds the battery steady state capacity and the auxiliary load demand. This is indicated by block 188 in the flow diagram of FIG. 3.

Figure 3:
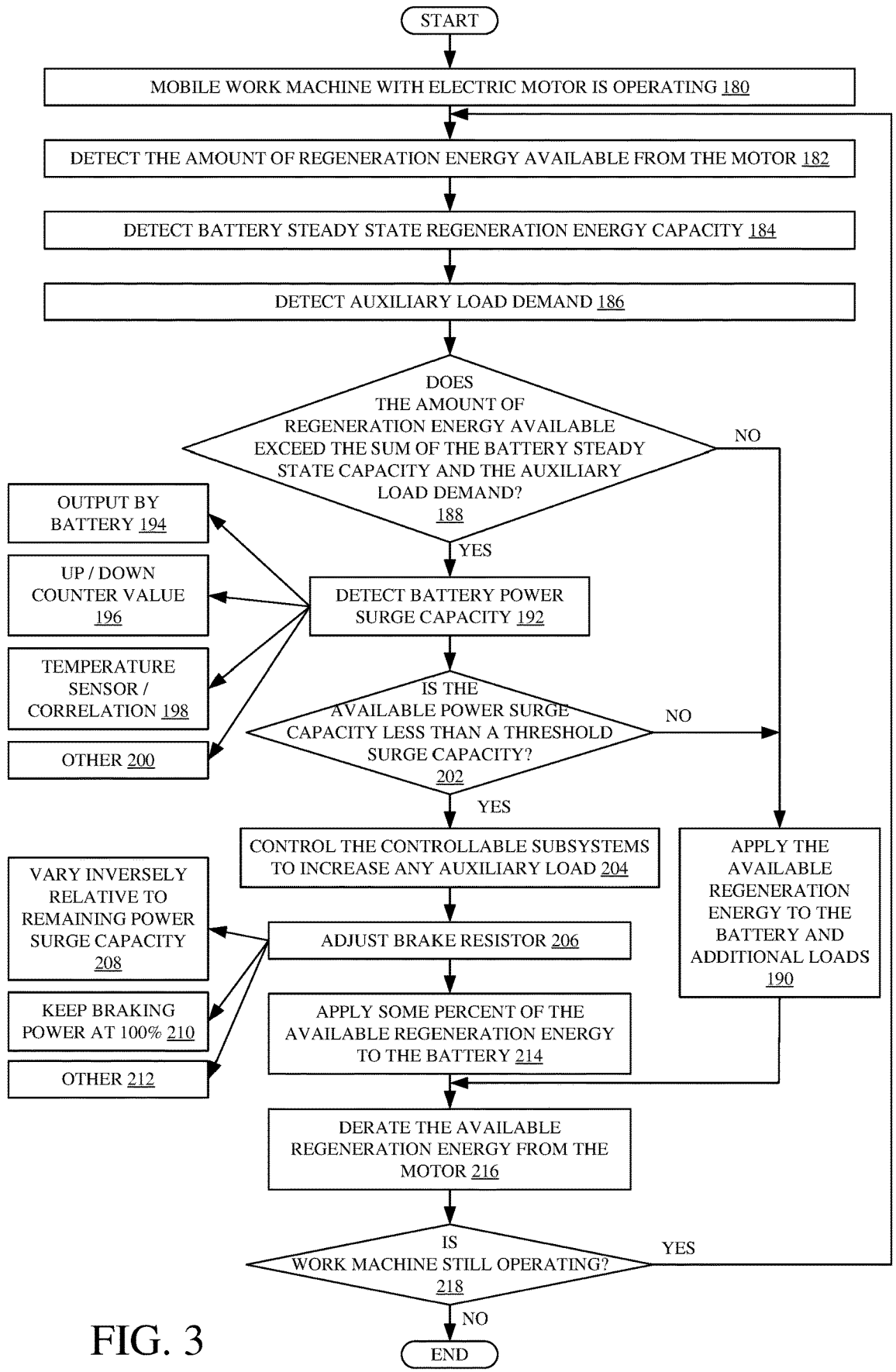
FIG. 3 is a flow diagram illustrating how the mobile work machine operates to use braking energy to regenerate (or recharge) a battery.

If the amount of regeneration energy that is available from electric motor 124 does not exceed the steady state capacity of battery 122 plus that being drawn by the auxiliary loads 136, then regeneration energy controller 168 controls electric motor 124 to apply the available regeneration energy to the rechargeable power storage elements 158 to recharge them, as indicated by block 190 in the flow diagram of FIG. 3.

However, if, at block 188, regeneration energy controller 168 determines that the amount of regeneration energy available from electric motor 124 does exceed the steady state capacity of batter 122 plus that being drawn by loads 136, then power surge capacity monitor 162 provides an output to regeneration energy controller 168 indicating the current power surge capacity of battery 122. Detecting the battery's power surge capacity is indicated by block 192 in the flow diagram of FIG. 3. In one example, the power surge capacity of battery 122 is output as a power surge capacity indicator by surge capacity detector 152, as indicated by block 194 in the flow diagram of FIG. 3.

Surge capacity detector 152 can take a number of different forms. For instance, detector 152 may be an up/down counter that provides a counter value as the output. The up/down counter illustratively counts up, as the power surge capacity of battery 122 goes up, so that a value of one hundred indicates that the power surge capacity of battery 122 is at 100% of its rated power surge capacity (which may be a pre-defined value or a variable value that is determined based on capacity variation criteria). The up/down counter can be calibrated to battery 122 empirically, through testing, or in other ways. Using an up/down counter value to determine the available power surge capacity of battery 122 is indicated by block 196 in the flow diagram of FIG. 3.

Surge capacity detector 152 may also be a temperature or thermal detector, along with a thermal model or look-up table that receives the thermal input, indicating the temperature of battery 122, and generates a value, where the power surge capacity is measured as follows:

$$\frac{I^2 T}{I^2 T\_rated} \quad \text{Eq. 1}$$

Where I=the current being drawn from battery 122;

T is the temperature of the battery sensed by the thermal sensor; and $I^2 T$\_rated is a reference value of $I^2 T$ for battery 122.

The value of $I^2 T$ is thus a measure of heat energy accumulated over a fixed span of time, such as the amount of heat energy accumulated in the last ten seconds.

A model or a lookup table or curve or other correlation structure can be used to generate an indication of power surge capacity based upon the value indicated by Equation 1. Detecting the battery power surge capacity based upon the input from a temperature sensor and correlation structure is indicated by block 198 in the flow diagram of FIG. 3. Detecting battery power surge capacity can be done in other ways as well, as indicated by block 200 in FIG. 3.

Regeneration energy controller 168 then determines whether the available power surge capacity for battery 122 is less than a threshold power surge capacity, as indicated by block 202 in the flow diagram of FIG. 3. For instance, it may be that the regeneration energy controller 168 will not apply the regeneration energy from electric motor 124 to battery 122 the regeneration energy exceeds fifty percent of the power surge capacity of battery 122. In another example, the threshold value may be some value other than fifty percent, and the value may be pre-defined, set by the operator, or set in other ways. If, at block 202, it is determined that the available power surge capacity for battery 122 is not less than the threshold power surge capacity value, then again regeneration energy controller 168 applies the regeneration energy from motor 124 to rechargeable power storage elements 158, in battery 122, to recharge battery 122. Applying the available regeneration energy to the battery is indicated by block 190.

However, if, at block 202 it is determined that the available power surge capacity of battery 122 is less than the threshold power surge capacity value, then regeneration energy controller 168 takes alternative actions, instead of simply applying all of the regeneration energy from electric motor 124 to battery 122. In one example, regeneration energy controller 168 can provide an output to control system 118 so that control system 118 controls auxiliary loads 136 to increase the load placed on battery 122 by one or more of the auxiliary loads 136. Controlling the controllable subsystems to increase the auxiliary load is indicated by block 204 in the flow diagram of FIG. 3.

In addition, depending on how far below the threshold value the available power surge capacity is, regeneration energy controller 168 can take additional steps as well. For instance, some of the regeneration energy generated by electric motor 124 can be diverted to brake resistor 126. Adjusting the energy applied to brake resistor 126 is indicated by block 206 in the flow diagram of FIG. 3. Also, as discussed above, instead of, or in addition to, diverting energy to brake resistor 126, energy can be diverted to pump 149 driving fluid through valve 151 or elsewhere. In one example, the amount of regeneration energy diverted to brake resistor 126 may vary inversely relative to the remaining power surge capacity of battery 122. Where there is more power surge capacity remaining at battery 122, then less of the regeneration energy is diverted to brake resistor 126 and more is applied to the rechargeable power storage elements 158 in battery 122. Where less power surge capacity remains at battery 122, then more of the regeneration energy output by electric motor 124 can be applied to brake resistor 126. Varying the amount of energy applied to brake resistor 126 based upon the remaining power surge capacity in battery 122 is indicated by block 208 in the flow diagram of FIG. 3. In one example, the amount of energy applied to brake resistor 126 can be adjusted to ensure that the braking power by motor 124 remains at 100% of the rated braking power, as indicated by block 210. The brake resistor 126 can be adjusted in other ways as well, as indicated by block 212.

Even after the auxiliary loads 136 are adjusted, and brake resistor 126 is adjusted, some percent of the available regeneration energy available from electric motor 124 may still be applied to rechargeable power storage elements 158, as indicated by block 214. Therefore, the remaining power surge capacity of battery 122 can be taken advantage of, in order to recharge battery 122, even where the remaining power surge capacity is less than 100% of the rated power surge capacity of battery 122.

As the regeneration energy provided by electric motor 124 is applied to battery 122, auxiliary loads 136, and brake resistor 126, the available regeneration energy at electric motor 124 is de-rated by available regeneration energy monitor 166 to indicate the current regeneration energy available at electric motor 124. De-rating the available regeneration energy from motor 124 is indicated by block 216 in the flow diagram of FIG. 3. As long as machine 100 is still operating, processing then reverts to block 182. This type of continuous operation is indicated by block 218 in the flow diagram of FIG. 3.

Figure 4:
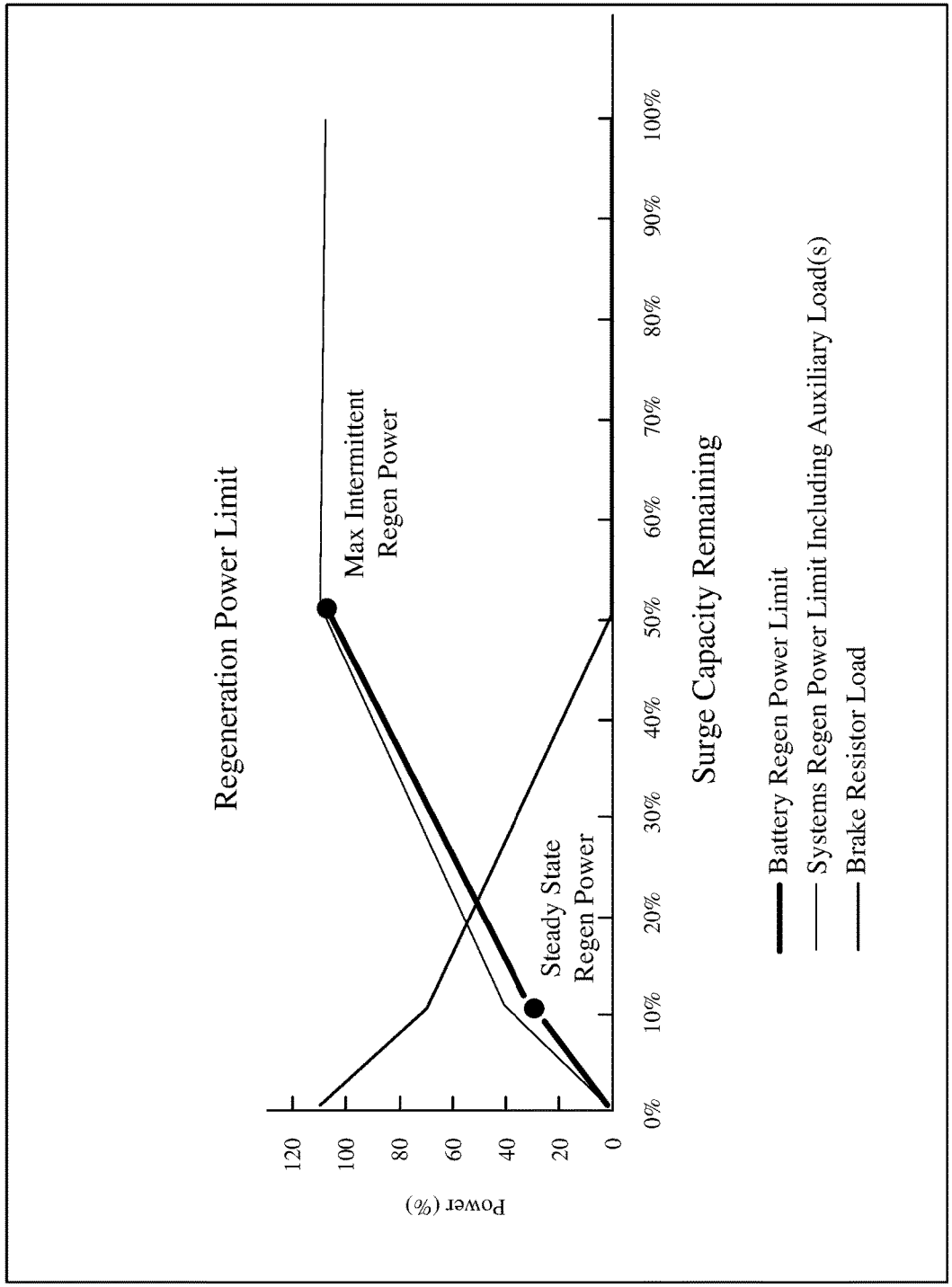
FIG. 4 is a graphic illustration of one example of the operation of the mobile work machine in applying regeneration energy.

FIG. 4 is a graph further illustrating one example of how the regeneration energy controller 168 controls application of the regeneration energy generated by electric motor 124 during an electric braking operation. FIG. 4 is illustrated with a power surge capacity threshold value of 50%. Therefore, when the power surge capacity remaining at battery 122 is above 50%, then none of the regeneration energy output by electric motor 124 is applied to the brake resistor. Instead, it may all be applied to the rechargeable power storage elements 158 in battery 122, or to both elements 158 and to the auxiliary loads 136 in controllable subsystems 120.

However, once the combination of the power surge capacity of battery 122 and the capacity of auxiliary loads 136 is less than 50% of the remaining power surge capacity of battery 122, then recharge energy controller 168 begins to divert some of the regeneration energy provided by electric motor 124 to brake resistor 126. FIG. 4 also shows that, in one example, as the available power surge capacity for battery 122 falls below 10% of the maximum power surge capacity of battery 122, then recharge energy controller 168 shifts a higher percentage of the regeneration energy provided by electric motor 124 to brake resistor 126. This reduces the likelihood that the battery will be damaged based upon variation in sensor tolerances or other estimation inaccuracies, etc.

It can thus be seen that the present description takes advantage of the power surge capacity of battery 122 so that more regeneration energy can be applied to battery 122 than if the power surge capacity of battery 122 is not considered. Similarly, even under conditions where the steady state capacity or power surge capacity of battery 122 may be diminished (e.g., when battery 122 is cold) the system can still take advantage of the available power surge capacity in charging battery 122, without damaging battery 122. This increases the runtime of battery 122 and thus improves the efficiency and performance of work machine 100.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 5:
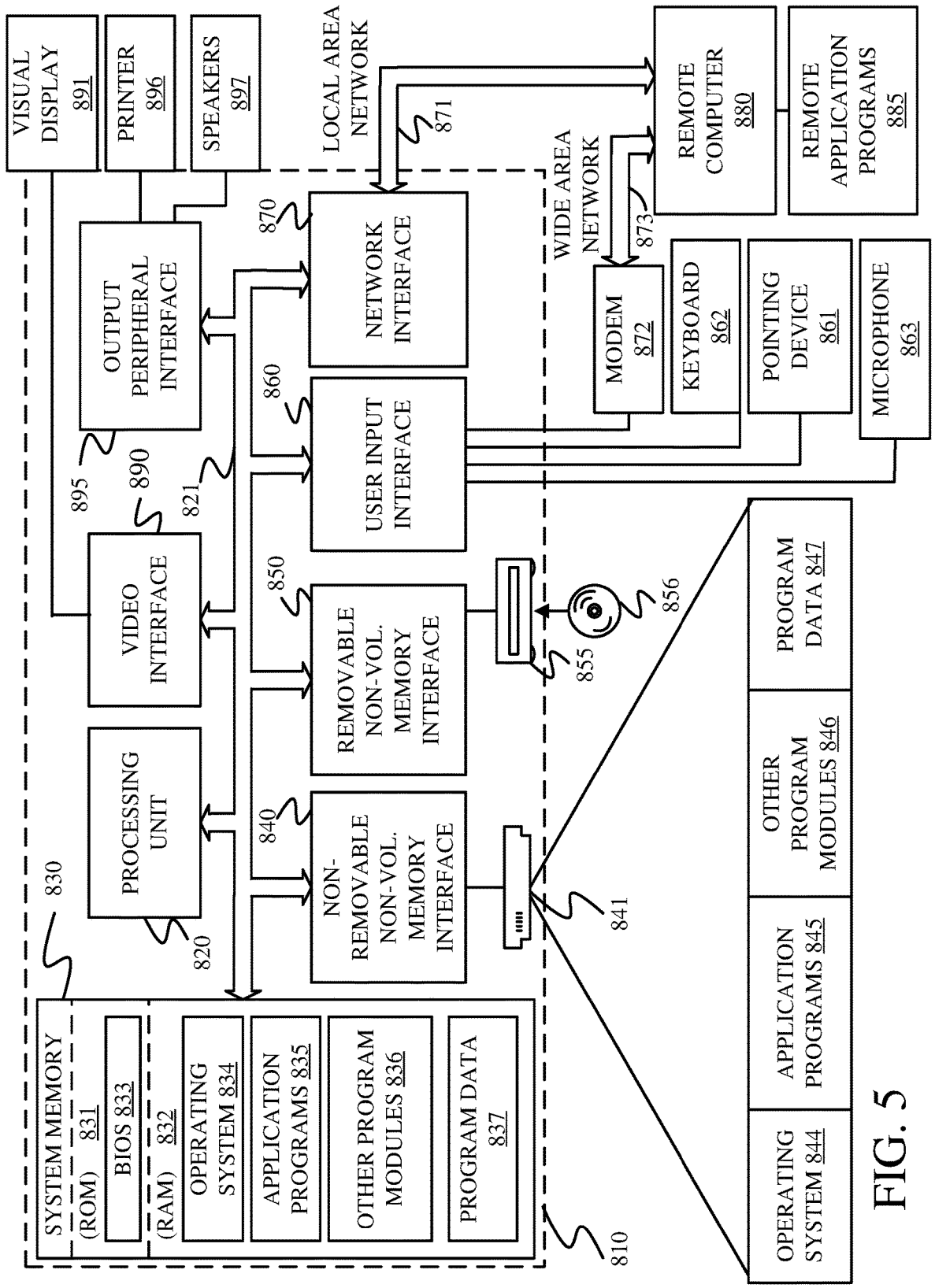
FIG. 5 is a block diagram of one example of a computing environment that can be used in the mobile work machine.

FIG. 5 is one example of a computing environment in which elements of FIG. 2, or parts of it, (for example) can be deployed. With reference to FIG. 5, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network—WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 5 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile work machine, comprising:
a ground engaging element;
a battery;
an electric motor that drives the ground engaging element; and
a charging control system that controls the application of regeneration energy, generated by the electric motor, to the battery based on a detected power surge capacity indicator, indicative of a power surge capacity of the battery.

Example 2 is the mobile work machine of any or all previous examples and further comprising:
a surge capacity detector that detects a variable indicative of the power surge capacity of the battery and generates the power surge capacity indicator.

Example 3 is the mobile work machine of any or all previous examples wherein the surge capacity detector comprises:
a thermal sensor that senses a thermal characteristic of the battery and generates the power surge capacity indicator based on the sensed thermal characteristic.

Example 4 is the mobile work machine of any or all previous examples and further comprising:
a steady state capacity detector that detects a variable indicative of steady state regeneration energy capacity of the battery and generates a steady state capacity indicator based on the detected variable indicative of the steady state regeneration energy capacity.

Example 5 is the mobile work machine of any or all previous examples wherein the charging control system comprises:
a regeneration energy monitor that detects available regeneration energy available from the electric motor.

Example 6 is the mobile work machine of any or all previous examples wherein the charging control system comprises:
a regeneration energy controller that determines whether the available regeneration energy available from the motor exceeds the steady state regeneration energy capacity of the battery and, if not, controls application of the regeneration energy to apply the regeneration energy from the electric motor to the battery.

Example 7 is the mobile work machine of any or all previous examples and further comprising:
an electrical load element that has a load capacity and wherein, if the regeneration energy controller determines that the available regeneration energy available from the motor exceeds the steady state regeneration energy capacity of the battery, the regeneration energy controller determines whether the regeneration energy from the electric motor exceeds the power surge capacity of the battery and, if so, controls application of the regeneration energy from the electric motor to apply the regeneration energy from the electric motor to the electrical load element.

Example 8 is the mobile work machine of any or all previous examples wherein the regeneration energy controller is configured to generate a load adjustment output to adjust the load capacity of the electrical load element based on whether the regeneration energy controller determines that the available regeneration energy available from the motor exceeds the power surge capacity of the battery.

Example 9 is the mobile work machine of any or all previous examples wherein the electric motor is configured to generate the regeneration energy while performing an electric braking operation and wherein the load element comprises:
a brake resistor; and
an auxiliary load element.

Example 10 is the mobile work machine of any or all previous examples wherein the regeneration energy controller is configured to control the auxiliary load element to adjust the load and to adjust application of the regeneration energy to the brake resistor and to the battery based on the power surge capacity of the battery.

Example 11 is the mobile work machine of any or all previous examples and further comprising:

a transmission, wherein the motor drives the ground engaging element through the transmission.

Example 12 is a method of controlling a mobile work machine, comprising:
initiating an electric motor that is powered by a battery to drive a set of ground engaging elements;
detecting a variable indicative of a power surge capacity of the battery;
generating a power surge capacity indicator indicative of the power surge capacity of the battery based on the detected variable; and
controlling application of regeneration energy, generated by the electric motor, to the battery, based on the power surge capacity indicator.

Example 13 is the method of any or all previous examples wherein detecting a variable indicative of the power surge capacity detector comprises:
sensing a thermal characteristic of the battery; and
generating the power surge capacity indicator based on the sensed thermal characteristic.

Example 14 is the method of any or all previous examples and further comprising:
detecting a variable indicative of steady state regeneration energy capacity of the battery;
generating a steady state capacity indicator based on the detected variable indicative of the steady state regeneration energy capacity;
detecting available regeneration energy available from the electric motor;
determining whether the available regeneration energy available from the motor exceeds the steady state regeneration energy capacity of the battery; and
if not, controlling application of the regeneration energy to apply the regeneration energy from the electric motor to the battery.

Example 15 is the method of any or all previous examples and further comprising:
if the available regeneration energy available from the motor exceeds the steady state regeneration energy capacity of the battery, determining whether the regeneration energy from the electric motor exceeds the power surge capacity of the battery; and
if so, applying the regeneration energy from the electric motor to an electric load element.

Example 16 is the method of any or all previous examples and further comprising:
generating a load adjustment output to adjust the load capacity of the electrical load element based on whether a determination that the available regeneration energy available from the motor exceeds the power surge capacity of the battery.

Example 17 is the method of any or all previous examples wherein generating a load adjustment output comprises:
controlling an auxiliary load element to adjust a load of the auxiliary load element to adjust application of the regeneration energy to a brake resistor and to the battery based on the power surge capacity of the battery.

Example 18 is a mobile work machine, comprising:
a ground engaging element;
a battery;
an electric motor that drives the ground engaging element;
a transmission, the motor driving the ground engaging element through the transmission;
a surge capacity detector that detects a variable indicative of a power surge capacity of the battery and generates a power surge capacity indicator based on the detected variable; and
a charging control system that controls the application of regeneration energy, generated by the electric motor, to the battery based on the power surge capacity indicator.

Example 19 is the mobile work machine of any or all previous examples and further comprising:
a steady state capacity detector that detects a variable indicative of steady state regeneration energy capacity of the battery and generates a steady state capacity indicator based on the detected variable indicative of the steady state regeneration energy capacity;
a regeneration energy monitor that detects available regeneration energy available from the electric motor; and
a regeneration energy controller that determines whether the available regeneration energy available from the motor exceeds the steady state regeneration energy capacity of the battery and, if not, controls application of the regeneration energy to apply the regeneration energy from the electric motor to the battery.

Example 20 is the mobile work machine of any or all previous examples and further comprising:
an electrical load element that has a load capacity and wherein, if the regeneration energy controller determines that the available regeneration energy available from the motor exceeds the steady state regeneration energy capacity of the battery, the regeneration energy controller determines whether the regeneration energy from the electric motor exceeds the power surge capacity of the battery and, if so, controls application of the regeneration energy from the electric motor to apply the regeneration energy from the electric motor to the electrical load element and generates a load adjustment output to adjust the load capacity of the electrical load element.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile work machine, comprising:
a ground engaging element;
an electric motor that drives the ground engaging element;
a battery having a steady state regeneration energy capacity defining a first rate at which the battery can continuously receive regeneration energy, generated by the electric motor, and a power surge capacity defining a second rate at which the battery can temporarily receive regeneration energy, generated by the electric motor, the second rate greater than the first rate; and
a charging control system that controls the application of regeneration energy, generated by the electric motor, to the battery based on a detected power surge capacity indicator, indicative of the power surge capacity of the battery.

2. The mobile work machine of claim 1 and further comprising:
a surge capacity detector that detects a variable indicative of the power surge capacity of the battery and generates the power surge capacity indicator.

3. The mobile work machine of claim 2 wherein the surge capacity detector comprises:
a thermal sensor that senses a thermal characteristic of the battery and generates the power surge capacity indicator based on the sensed thermal characteristic.

4. The mobile work, machine of claim 2 and further comprising:
a steady state capacity detector that detects a variable indicative of the steady state regeneration energy capacity of the battery and generates a steady state capacity indicator based on the detected variable indicative of the steady state regeneration energy capacity.

5. The mobile work machine of claim 4 wherein the charging control system comprises:
a regeneration energy monitor that detects available regeneration energy available from the electric motor.

6. The mobile work machine of claim 5 wherein the charging control system comprises:
a regeneration energy controller that determines whether the available regeneration energy available from the motor exceeds the steady state regeneration energy capacity of the battery and, if not, controls application of the regeneration energy to apply the regeneration energy from the electric motor to the battery.

7. The mobile work machine of claim 6 and further comprising:
an electrical load element that has a load capacity and wherein, if the regeneration energy controller determines that the available regeneration energy available from the motor exceeds the steady state regeneration energy capacity or the battery, the regeneration energy controller determines whether the regeneration energy from the electric motor exceeds the power surge capacity of the battery and, if so, controls application of the regeneration energy front the electric motor to apply the regeneration energy from the electric motor to the electrical load element.

8. The mobile work machine of claim 7 wherein the regeneration energy controller is configured to generate a load adjustment output to adjust the load capacity of the electrical load element based on whether the regeneration energy controller determines that the available regeneration energy available from the motor exceeds the power surge capacity of the battery.

9. The mobile work machine of claim 8 wherein the electric motor is configured to generate the regeneration energy while performing an electric braking operation and wherein the load element comprises;
a brake resistor; and
an auxiliary load element.

10. The mobile work machine of claim 9 wherein the load element comprises:
an electric motor that drives a pump to pump hydraulic fluid through a valve.

11. The mobile work machine of claim 8 wherein the regeneration energy controller is configured to control the auxiliary load element to adjust the load and to adjust application of the regeneration energy to the brake resistor and to the battery based on the power surge capacity of the battery.

12. The mobile work machine of claim 1 and further comprising:
a transmission, wherein the motor drives the ground engaging element through the transmission.

13. A method of controlling a mobile work machine, comprising:
initiating an electric motor that is powered by a battery to drive a set of ground engaging elements, the battery having a steady state regeneration energy capacity defining a first rate at which the battery can continuously receive regeneration energy, generated by the electric motor, and a power surge capacity defining a second rate at which the battery can temporarily receive regeneration energy, generated by the electric motor, the second rate greater than the first rate;
detecting a variable indicative of the power surge capacity of the battery;
generating, a power surge capacity indicator indicative of the power surge capacity of the battery based on the detected variable; and
controlling application of regeneration energy, generated by the electric motor, to the battery, based on the power surge capacity indicator.

14. The method of claim 13 wherein detecting the variable indicative of the power surge capacity comprises:
sensing a thermal characteristic of the battery; and
generating the power surge capacity indicator based on the sensed thermal characteristic.

15. The method of claim 13 and further comprising:
detecting a variable indicative of the steady state regeneration energy capacity of the battery;
generating a steady state capacity indicator based on data detected variable indicative of the steady state regeneration energy capacity;
detecting available regeneration energy available from the electric motor;
determining that the available regeneration energy available from the motor does not exceed the steady state regeneration energy capacity of the battery; and
controlling application of the regeneration energy to apply the regeneration energy from the electric motor to the battery based on the determination.

16. The method of claim 13 and further comprising:
detecting a variable indicative of the steady state regeneration energy capacity of the battery;
generating a steady state capacity indicator based on the detected variable indicative of the steady state regeneration energy capacity;
determining that the available regeneration energy available from the motor exceeds both the steady state regeneration energy capacity of the battery and the power surge capacity of the battery; and
applying the regeneration energy from the electric motor to an electric load element based on the determination.

17. The method of claim 16 and further comprising:
generating a load adjustment output to adjust the load capacity of the electrical load element based on the determination.

18. The method of claim 17 wherein generating the load adjustment output comprises:
controlling an auxiliary load element to adjust a load of the auxiliary load element to adjust application of the regeneration energy to a brake resistor and to the battery based on the power surge capacity of the battery.

19. A mobile work machine, comprising:
a ground engaging element;
a battery having a steady state regeneration energy capacity defining a first rate at which the battery can continuously receive regeneration energy, generated by the electric motor, and a power surge capacity defining a second rate at which the battery can temporarily receive regeneration energy, generated by the electric motor, the second rate greater than the first rate;

an electric motor that drives the ground engaging element;

a transmission, the motor driving the ground engaging element through the transmission;

a surge capacity detector that detects a variable indicative of the power surge capacity of the battery and generates a surge energy capacity indicator based on the detected variable; and a charging control system that controls the application of regeneration energy, generated by the electric motor, to the battery based on the power surge capacity indicator.

20. The mobile work machine of claim 19 and further comprising:

a steady state capacity detector that detects a variable indicative of the steady state regeneration energy capacity of the battery and generates a steady state capacity indicator based on the detected variable indicative of the steady state regeneration energy capacity;

a regeneration energy monitor that detects available regeneration energy available from the electric motor; and a regeneration energy controller that determines whether the available regeneration energy available from the motor exceeds the steady state regeneration energy capacity of the battery and, if not, controls application of the regeneration energy to apply the regeneration energy from the electric motor to the battery.

* * * * *